W. T. BATTY.
Car Brake

No. 77,159.  Patented April 28, 1868.

Witnesses:

Inventor:
William T. Batty.

United States Patent Office.

WILLIAM T. BATTY, OF CANTON, OHIO, ASSIGNOR TO HIMSELF AND GRIFFITH DESHART, OF SAME PLACE.

*Letters Patent No. 77,159, dated April 28, 1868.*

IMPROVED CAR-BRAKE.

*The Schedule referred to in these Letters Patent and making part of the same.*

TO ALL WHOM IT MAY CONCERN:

Be it known that I, WILLIAM T. BATTY, of Canton, in the county of Stark, and State of Ohio, have invented new and useful Improvements in Self-Acting Car-Brakes; and I do hereby declare that the following is a full, clear, and exact description of my invention, reference being had to the accompanying drawings, and to the letters of reference marked thereon, of which drawings—

Figure 1:
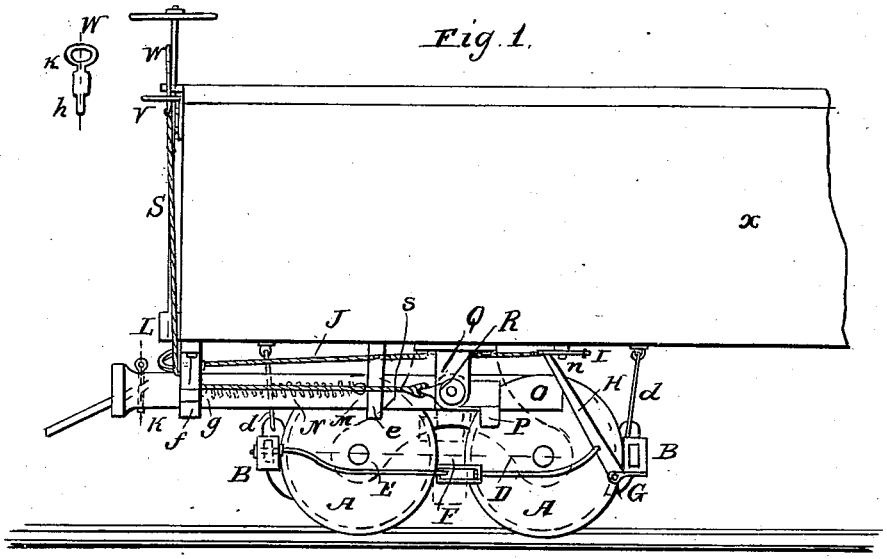
Figure 1 is a side view of a box-car with my improved brake attached, the wheels and boxes on the side toward the observer being taken off, to show more clearly the arrangement.
Figure 2:
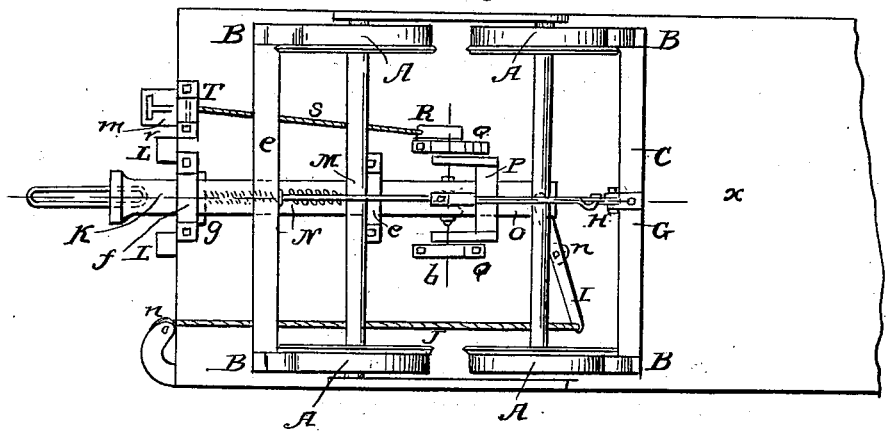
Figure 2 is a plan of the same, seen from below the car.
Figure 3:
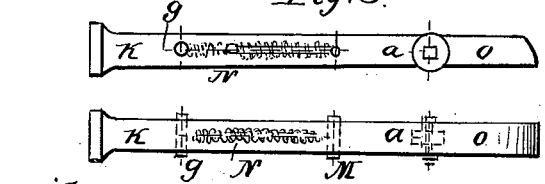
Figures 3 are side view and plan of coupling or draw-bar, and its attachment.
Figure 4:
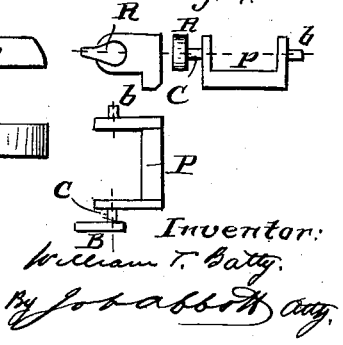
Figures 4 are side and end view and plan of supporter for knuckle-joint on the draw-bar.

The nature of my invention consists in the peculiar arrangement of a knuckle-joint at the end of the coupling or draw-bar, which acts, in connection with the brake-lever, to form a self-acting brake, whenever the engine is slacked up, so as to cause the coupling-heads to come together, or when, from any cause, the cars are brought up together, so as to bring said coupling-heads together, said knuckle-joint being held in working position, so as to make a self-acting brake by a supporter, which supporter is arranged on axes, so as to have a partial rotation, and when let down, so as to let the knuckle-joint fall out of its working position, allows the brake to be operated in the ordinary manner.

The peculiar utility of this invention, aside from its simplicity and cheapness, lies in the fact that it can be used either as an automatic brake, or an ordinary brake, or both, by a single change, which is very easily and quickly effected, which feature is very advantageous in backing a train, or moving a single car on the main track, or on switches.

To enable others skilled in the art to make and use my invention, I will proceed to describe its construction and operation.

X represents the car-body, which is supported by wheels A A, arranged on axes, and attached to the car-body in an ordinary manner.

B B B B are the brake-blocks, hung on links $d\ d\ d\ d$, and connected by the brake-bars C C. The hinge-iron G is attached to brake-bar C, and has the brake-lever H attached to it, as shown. The rods E and D, with swivel-joint F, connect the brake-bar C and brake-lever H, as shown, the screw-swivel joint F serving to regulate the intensity of the action of the brakes.

The coupling or draw-bar K is arranged in hangers $e\ f$, which are attached to car-body X, as shown, and is free to slide in said hangers, being prevented from pulling out by a pin, $g$, arranged in connection with hanger $f$, as shown.

A spring, N, is arranged in the coupling-bar, as shown, and presses against the flattened bolt M, which moves in slots in the sides of said coupling-box, and presses against the hanger $e$, thus serving to keep the coupling-bar K always pressed out. At the rear end of coupling-bar K is hung the knuckle-joint O, having the bolt $a$ as its axis.

The supporter P has the two axes $b$ and $c$, which are arranged in hangers or boxes, Q Q, as shown. On the axis $c$ is arranged the crank R, and to this crank is attached the chain S, which passes over the pulley T, arranged as shown, and up to the iron, W, which works in the iron, V, fastened either to the platform or top of the car, as is most convenient.

It is readily seen that when the iron, W, is in the position shown, the supporter P will be held up, and will hold up the knuckle-joint O, in the proper position to act on the brake-lever H, but that if the iron, W, be dropped through the hole $m$ in iron, V, from the notch $h$ to the notch $k$, the chain or cord S, being slackened, the supporter P and knuckle-joint O will fall, by their own weight, into the position shown by dotted lines, and that when in such position, the pushing back of the coupling-bar K will not cause any action of the brake-lever H.

A lever, I, is attached by bolt $n$ to the car-body X, and has one end attached to brake-lever H, and the other, by chain J, to the ordinary brake-rod, U, by means of which the brakes are operated on as ordinary car-brakes.

Bumpers, L L, of any suitable form, are arranged in the ordinary manner, to prevent the cars from coming too close together.

It is readily seen, from the foregoing description, that when a train of cars is provided with this brake, as soon as the locomotive and tender slacken their speed, the balance of the train will come forward and together, and thus all the brakes will be applied to stop the train, and as soon as the engine is started, and the train drawn out, the brakes will all be loosened; and also, that in case the self-acting mechanism is not wanted for use, the irons W, at the end of each car where said mechanism is not wanted, are dropped down, and the brakes are operated by the wheel on brake-rod U, in the ordinary manner.

I do not claim, as my invention, any part of car-body X, or the wheels A A, or any of their attachments, or the draw-bar K, or brakes B C B, or brake-lever H, or rods E F D, or hangers Q Q $e$ and $f$, or chain J, or brake-rod U, nor spring N or bolt M, nor lever I or chain J; nor do I claim the use of the knuckle-joint O on the draw-bar K, taken separately from the supporter P; but What I do claim as my invention, and desire to secure by Letters Patent, is—

1. The supporter P, with axes $b$ and $c$, and crank R, when used in connection with knuckle-joint O, substantially as and for the purpose herein shown.

2. The peculiar arrangement and combination of the crank R, chain S, pulley T, iron, W, iron, V, and car-body X, the several parts being arranged as and for the purposes herein specified.

3. The peculiar arrangement and combination of the draw-bar K, knuckle-joint O, supporter P, and brake-lever H, the several parts being arranged and combined substantially as and for the purpose specified.

As evidence that I claim this as my invention, I have hereunto set my hand, in presence of two witnesses, this 26th day of December, 1867.

W. T. BATTY.

Witnesses:
    JOB ABBOTT,
    E. N. BEEBOUT.